(12) United States Patent
Yamamoto

(10) Patent No.: US 10,081,085 B2
(45) Date of Patent: Sep. 25, 2018

(54) TOOL CHANGER

(71) Applicant: DMG MORI CO., LTD., Nara (JP)

(72) Inventor: Koji Yamamoto, Nara (JP)

(73) Assignee: DMG Mori Co., Ltd., Nara (JP)

( * ) Notice: Subject to any disclaimer, the term of this patent is extended or adjusted under 35 U.S.C. 154(b) by 267 days.

(21) Appl. No.: 15/261,421

(22) Filed: Sep. 9, 2016

(65) Prior Publication Data

US 2017/0087679 A1    Mar. 30, 2017

(30) Foreign Application Priority Data

Sep. 30, 2015    (JP) .................................. 2015-192686

(51) Int. Cl.
*B23Q 3/157* (2006.01)
*B23Q 3/155* (2006.01)

(52) U.S. Cl.
CPC ....... *B23Q 3/15713* (2013.01); *B23Q 3/1574* (2013.01); *B23Q 3/15746* (2013.01); *B23Q 2003/15532* (2016.11); *B23Q 2003/155414* (2016.11); *B23Q 2003/155425* (2016.11); *B23Q 2003/155439* (2016.11); *Y10T 483/13* (2015.01); *Y10T 483/1767* (2015.01)

(58) Field of Classification Search
CPC ............. Y10T 483/13; Y10T 483/1748; Y10T 483/1752; Y10T 483/1755; Y10T 483/1767; Y10T 483/1779; B23Q 3/15713; B23Q 2003/155414; B23Q 2003/155425; B23Q 2003/155428; B23Q 2003/155435; B23Q 2003/155439

USPC ....... 483/7, 36, 38, 39, 44, 49; 700/174, 177
See application file for complete search history.

(56) References Cited

U.S. PATENT DOCUMENTS 4,414,732 A * 11/1983 Tomita ............... B23Q 3/15553
                                                    483/35
4,833,772 A *  5/1989 Kobayashi ......... B23Q 3/15526
                                                    483/44
(Continued)

FOREIGN PATENT DOCUMENTS

JP        H08004990 Y    2/1996
JP        2000193062 A   7/2000
(Continued)

*Primary Examiner* — Sunil K Singh
*Assistant Examiner* — Michael Vitale
(74) *Attorney, Agent, or Firm* — Miller, Matthias & Hull LLP

(57) ABSTRACT

A tool changer includes a holding member having a tool change arm, a rotating mechanism for rotating the holding member, a forward/backward moving mechanism for moving the holding member forward and backward, and a controller controlling the mechanisms. A zero return controller determines whether the tool change arm is holding tools. When it is not holding tools, the tool change arm is rotated to a predetermined non-interference angle, the tool change arm is translated to a forward/backward movement zero point, and the tool change arm is rotated to a rotation zero point. When it is holding tools, the tool change arm is translated to a forward end, the tool change arm is rotated to position it on an expected path, and the tool change arm is moved along the expected path, thereby moving the tool change arm to the rotation zero point and the forward/backward movement zero point.

3 Claims, 10 Drawing Sheets

(56) References Cited

U.S. PATENT DOCUMENTS

| | | | | |
|---|---|---|---|---|
| 5,257,199 | A | * | 10/1993 | Tsujino ................ G05B 19/128 235/375 |
| 5,816,987 | A | * | 10/1998 | Yan .................... B23Q 3/15713 483/38 |
| 6,719,677 | B2 | * | 4/2004 | Izumi ................ B23Q 3/15526 318/672 |
| 2002/0094920 | A1 | * | 7/2002 | Yasumatsuya ....... G05B 19/182 483/1 |
| 2003/0114282 | A1 | * | 6/2003 | Kato .................. B23Q 3/1554 483/39 |
| 2011/0201484 | A1 | * | 8/2011 | Isozumi .................. B23Q 3/12 483/36 |

FOREIGN PATENT DOCUMENTS

| KR | 100626125 B1 | * | 9/2006 |
|---|---|---|---|
| WO | WO 2004037484 A1 | * | 5/2004 |

\* cited by examiner

TOOL CHANGER

BACKGROUND

Field of the Disclosure

The present disclosure relates to a tool changer that changes a tool attached to a spindle of a machine tool with a next tool positioned at a standby position.

Background of the Disclosure

Various types of tool changer have been known; among them, a so-called double arm type tool changer is generally used at the present time. This type of tool changer is configured to include a holding member disposed to have a center axis parallel to an axis of the spindle and provided to be rotatable about the center axis and to be movable in a direction along the axis of the spindle, a rotating mechanism for rotating the holding member in normal and reverse directions about the center axis, a forward/backward moving mechanism for moving the holding member forward and backward in the direction along the axis of the spindle, a tool change arm (double arm) having two arm portions each disposed on the holding member to extend in a radial direction with respect to the center axis of the holding member so that they form a straight line and each having a tool holding part that has an opening in a side surface thereof facing the normal rotation direction of the holding member, the arm portions holding the tools with the tool holding parts in such a manner that axes of the tools are parallel to the center axis of the holding member, and a controller controlling the rotating mechanism and the forward/backward moving mechanism.

Further, well-known examples of the tool changer having the above-described configuration include a hydraulic type using hydraulic pressure as a drive source for the rotating mechanism and the forward/backward moving mechanism, a type using a cam mechanism driven by an AC motor (cam driving type), a type using a servo motor (servo motor driving type) as disclosed in Japanese Unexamined Patent Application Publication No. 2000-193062 and Japanese Examined Utility Model Application Publication No. H8-4990. The hydraulic type tool changer was used at the early stage of development, and the cam driving type tool changer was developed thereafter for the purpose of shortening changing time. Further, in recent years, the servo motor driving type tool changer has been employed because advances in technology for the driving mechanism, such as increase in servo motor speed, has enabled the tools to be changed in less time than using the cam driving type tool changer.

By the way, in the servo motor driving type tool changer, a servo motor as a part of the rotating mechanism (rotation driving servo motor) and a servo motor as a part of the forward/backward moving mechanism (forward/backward movement driving servo motor) are controlled by the controller. Further, the servo motor driving type tool changer is configured so that an angular position of the tool change arm is detected by an encoder attached to the rotation driving servo motor (rotation encoder) and similarly a forward/backward movement position of the tool change arm is detected by an encoder attached to the forward/backward movement driving servo motor (forward/backward movement encoder).

More specifically, an angular position of the tool change arm is calculated from current number of revolutions and angle of rotation (rotational position data) of the rotation servo motor, which are detected as absolute values (which means that they are not relative values; the same is applied hereinafter) by the rotation encoder, and a reduction ratio of a transmission mechanism, which transmits power of the rotation servo motor to the holding member to rotate the holding member, relative to the rotation servo motor.

Further, a forward/backward movement position of the tool change arm is calculated from current number of revolutions and angle of rotation (rotational position data) of the forward/backward movement servo motor, which are detected as absolute values by the forward/backward movement encoder, and a lead of a ball screw mechanism that transmits power of the forward/backward movement servo motor to the holding member to move the holding member forward or backward.

Further, the tool change arm is controlled by the controller; the rotation thereof is controlled based on the rotational position data of the rotation servo motor detected as described above and a rotation zero point that is set as appropriate from the rotational position data, and the forward/backward movement thereof is controlled based on the rotational position data of the forward/backward movement servo motor and a forward/backward movement zero point that is set as appropriate from the rotational position data.

Noted that the rotation encoder has a memory therein and data detected by the rotation encoder is held as rotational position data in the memory. Similarly, the forward/backward movement encoder also has a memory therein and data detected by the forward/backward movement encoder is held as rotational position data in the memory. Further, the holding of the data in each memory is realized by electrical power supplied from the controller or a back-up battery through an appropriate cable. Furthermore, data on the rotation zero point and data on the forward/backward movement zero point are stored in the controller.

SUMMARY OF THE DISCLOSURE

By the way, the controller of the tool changer is in conjunction with a controller of the machine tool. When abnormality occurs in the machine tool and the machine tool is urgently stopped, the tool changer is also urgently stopped in response thereto. Further, as a matter of course, when abnormality occurs in the tool changer, the tool changer is urgently stopped and the machine tool is also urgently stopped in response thereto.

When the tool changer is urgently stopped during its operation, the tool change arm has to be returned to the rotation zero point and the forward/backward movement zero point in order to restart operation of the tool changer after the abnormality is eliminated. If such a zero return operation can be automatically executed, the tool changer is able to recover from abnormality rapidly, which is efficient and convenient.

However, in the above-described servo motor driving type tool changer, unlike the cam driving type tool changer, when operation of the tool changer is urgently stopped, the tool change arm cannot be stopped immediately and the tool change arm may be stopped at a position (a rotational position and a forward/backward movement position) deviating from a regular operation path due to inertia and the like produced at the time of the urgent stop. Therefore, the tool change arm cannot be automatically returned to the rotation zero point and the forward/backward movement zero point only by executing a usual operation for tool change.

Therefore, appropriate improvement or development is necessary for automatically returning the tool change arm which is stopped at a position deviating from a regular operation path to the rotation zero point and the forward/ backward movement zero point. However, there has never been proposed a tool changer which is capable of automatically returning a tool change arm deviating from a regular operation path to a rotation zero point and a forward/backward movement zero point.

The present disclosure has been achieved in view of the above-described circumstances and an object thereof is to provide a tool changer which is capable of automatically returning a tool change arm deviating from a regular operation path to a rotation zero point and a forward/backward movement zero point.

The present disclosure, for solving the above-described problem, relates to a tool changer that changes a tool attached to a spindle of a machine tool with a next tool positioned at a standby position, including:

a holding member disposed to have a center axis parallel to an axis of the spindle and provided to be rotatable about the center axis and to be movable in a direction along the axis of the spindle;

a rotating mechanism including a rotation servo motor and rotating the holding member in normal and reverse directions about the center axis by using power of the rotation servo motor;

a forward/backward moving mechanism including a forward/backward movement servo motor and moving the holding member forward and backward in the direction along the axis of the spindle by using power of the forward/backward movement servo motor;

a tool change arm having at least two arm portions each disposed on the holding member to extend in a radial direction with respect to the center axis of the holding member and each having a tool holding part having an opening in a side surface thereof facing the normal rotation direction of the holding member, the arm portions holding the tools with the tool holding parts in such a manner that axes of the tools are parallel to the center axis of the holding member; and a controller numerically controlling the rotation servo motor with respect to a rotation zero point set at a predetermined angular position in a rotational direction about the center axis to rotate the holding member and the tool change arm, and numerically controlling the forward/backward movement servo motor with respect to a forward/backward movement zero point set at a predetermined position in the direction along the axis of the spindle to move the holding member and the tool change arm forward and backward, thereby causing the tool change arm to execute a change operation in which the tool holding parts of the tool change arm move on a predetermined path, the controller further including a zero return controller returning the tool change arm to the rotation zero point and the forward/backward movement zero point when the change operation executed by the tool change arm is stopped halfway, the zero return controller being configured to execute a first processing of determining whether the tool holding parts of the tool change arm are holding the tools, a second processing of, when it is determined in the first processing that the tool holding parts are not holding the tools, rotating the tool change arm to a non-interference angle, and subsequently moving the tool change arm backward to the forward/backward movement zero point and then rotating the tool change arm to the rotation zero point, the non-interference angle being a predetermined angle to which the tool change arm can be rotated without interference with other structures and at which the tool change arm does not interfere with the other structures even when the tool change arm is moved forward or backward, and a third processing of, when it is determined in the first processing that the tool holding parts are holding the tools, moving the tool change arm to a position corresponding to a forward end of the path along the forward/backward movement direction, and, if the tool holding parts are not positioned on the path, subsequently rotating the tool change arm to position the tool holding parts on the path, and then moving the tool change arm so that the tool holding parts follow the path, thereby moving the tool change arm to the rotation zero point and the forward/backward movement zero point.

According to this tool changer, when the change operation executed by the tool change arm is stopped halfway, an operation for returning the tool change arm to the rotation zero point and the forward/backward movement zero point is executed by the zero return controller.

That is, the zero return controller first determines in the first processing whether the tool holding parts of the tool change arm are holding the tools. Specifically, the determination whether the tool holding parts are holding the tools can be made, for example, by recognizing when during the tool change operation the operation is stopped, or based on whether a tool is detected by an sensor provided on the tool holding parts.

When it is determined that the tool holding parts are not holding the tools, the tool change arm is rotated to the non-interference angle, and subsequently the tool change arm is moved backward to the forward/backward movement zero point and then the tool change arm is rotated to the rotation zero point (second processing). The non-interference angle is an angle to which the tool change arm can be rotated without interference with other structures and at which the tool change arm does not interfere with the other structures even when the tool change arm is moved forward or backward. The non-interference angle is previously determined, for example, based on a structure design relationship, and may have a certain range.

Since such a non-interference angle is previously determined, the tool change arm can be rotated to the non-interference angle without interference with the other structures and the tool change arm can be returned to the forward/backward movement zero point by moving the tool change arm backward at the non-interference angle. Subsequently, the tool change arm returned to the forward/backward movement zero point is rotated to a rotation zero point at which the tool change arm is positioned before the start of the change operation (current rotation zero point) or to a rotation zero point at which the tool change arm is to be positioned after completion of the change operation (next rotation zero point). Note that the determination whether the tool change arm is rotated to the current rotation zero point or to the next rotation zero point is made by selecting one which allows the tool change arm not to interfere with the other structures during the rotation.

Thus, when the tool holding parts are not holding the tools, the tool change arm can be automatically returned to the forward/backward movement zero point and the rotation zero point by executing the second processing.

On the other hand, when it is determined in the first processing that the tool holding parts are holding the tools, there is no concern that the tool change arm interferes with the other structures when the tool change arm is moved forward at the rotational angular position of that time; therefore, the tool change arm is moved to a position corresponding to a forward end of the path.

After the tool change arm has been moved to the position corresponding to the forward end of the path as described above, the tool change arm does not interfere with the other structures even when it is rotated at that position. Therefore, if the tool holding parts are not on the path, the tool change arm is rotated so as to position the tool holding parts on the path. Thereafter, the tool change arm is moved so that the tool holding parts follow the path, whereby the tool change arm is moved to the rotation zero point and the forward/backward movement zero point (third processing).

Thus, when the tool holding parts are holding the tools, the tool change arm can be automatically returned to the forward/backward movement zero point and the rotation zero point by executing the third processing.

As described above, according to the tool changer of the present disclosure, the tool change arm can be automatically returned to the rotation zero point and the forward/backward movement zero point without interference with the other structures even when the tool change arm is stopped at a position deviating from a regular operation path due to an urgent (emergency) stop or the like, which enables a rapid and efficient return operation.

Further, in the present disclosure, the tool change arm may include two said arm portions each extending in a radial direction with respect to the center axis of the holding member so that they form a straight line, the controller may be configured to control the rotation servo motor and the forward/backward movement servo motor to cause the tool change arm to execute a change operation, the change operation including:

a first rotating operation of rotating the tool change arm to a first turning angle to cause the tool holding parts to hold the tools, the first turning angle being an angle rotated by a predetermined angle in the normal direction from a current rotation zero point, the current rotation zero point being a rotation zero point before the start of the operation and;

a tool pulling operation of moving the tool change arm forward to a forward end;

a second rotating operation of rotating the tool change arm to a second turning angle, the second turning angle being at a position rotated by 180 degrees in the normal direction from the first turning angle;

a tool attaching operation of moving the tool change arm backward to the forward/backward movement zero point; and a third rotating operation of rotating the tool change arm to a next rotation zero point, the next rotation zero point being an angular position rotated by the predetermined angle in the reverse direction from the second turning angle and being a rotation zero point after completion of the operation, and the zero return controller may be configured to, in the second processing, when the tool change arm is positioned between the current rotation zero point and the first turning angle, rotate the tool change arm to a first non-interference angle set between the current rotation zero point and the first turning angle, and subsequently move the tool change arm backward to the forward/backward movement zero point and then rotate the tool change arm to the current rotation zero point, and on the other hand, when the tool change arm is positioned between the first turning angle and the second turning angle, rotate the tool change arm to a second non-interference angle set between the next rotation zero point and the second turning angle, and subsequently move the tool change arm backward to the forward/backward movement zero point and then rotate the tool change arm to the next rotation zero point.

The thus-configured tool changer is a so-called double arm type tool changer. In the case of this tool changer, as described above, in the second processing, when the tool change arm is positioned between the current rotation zero point and the first turning angle, the tool change arm is first rotated to a first non-interference angle set between the current rotation zero point and the first turning angle, and subsequently the tool change arm is moved backward to the forward/backward movement zero point and then rotated to the current rotation zero point. When the tool change arm is positioned between the current rotation zero point and the first turning angle, the non-interference angle defined as described above can be set as a first non-interference angle between the current rotation zero point and the first turning angle, and rotating the tool change arm to the first non-interference angle allows the tool change arm to be returned to the rotation zero point and the forward/backward movement zero point without interference with the other structures.

On the other hand, when the tool change arm is positioned between the first turning angle and the second turning angle, the tool change arm is first rotated to a second non-interference angle set between the next rotation zero point and the second turning angle, and subsequently the tool change arm is moved backward to the forward/backward movement zero point and then rotated to the next rotation zero point. When the tool change arm is positioned between the first turning angle and the second turning angle, the non-interference angle can be set as a second non-interference angle between the first turning angle and the second turning angle, and rotating the tool change arm to the second non-interference angle allows the tool change arm to be returned to the rotation zero point and the forward/backward movement zero point without interference with the other structures.

In the case of the double arm type tool changer, the tool change arm can be automatically returned to the rotation zero point and the forward/backward movement zero point without interference with the other structures by the zero return controller executing this second processing, which enables a rapid and efficient return operation.

Further, in the case of this double arm type tool changer, the zero return controller may be configured to, in the third processing, after moving the tool change arm to a position corresponding to the forward end of the path along the forward/backward movement direction, when the tool change arm is positioned between the current rotation zero point and the first turning angle, rotate the tool change arm to the first turning angle, and subsequently move the tool change arm backward to the forward/backward movement zero point and then rotate the tool change arm to the current rotation zero point, on the other hand, when the tool change arm is positioned between the first turning angle and the second turning angle, first rotate the tool change arm to the first turning angle, and subsequently move the tool change arm backward to the forward/backward movement zero point and then rotate the tool change arm to the current rotation zero point, or first rotate the tool change arm to the second turning angle, and subsequently move the tool change arm backward to the forward/backward movement zero point and then rotate the tool change arm to the next rotation zero point.

As described above, according to the tool changer of the present disclosure, the tool change arm can be automatically returned to the rotation zero point and the forward/backward movement zero point without interference with the other structures even when the tool change arm is stopped at a position deviating from a regular operation path due to an urgent stop or the like, which enables a rapid and effective return operation.

BRIEF DESCRIPTION OF THE DRAWINGS

For a more complete understanding of the disclosed methods and apparatus, reference should be made to the embodiment illustrated in greater detail on the accompanying drawings, wherein.

DETAILED DESCRIPTION

Figure 1:
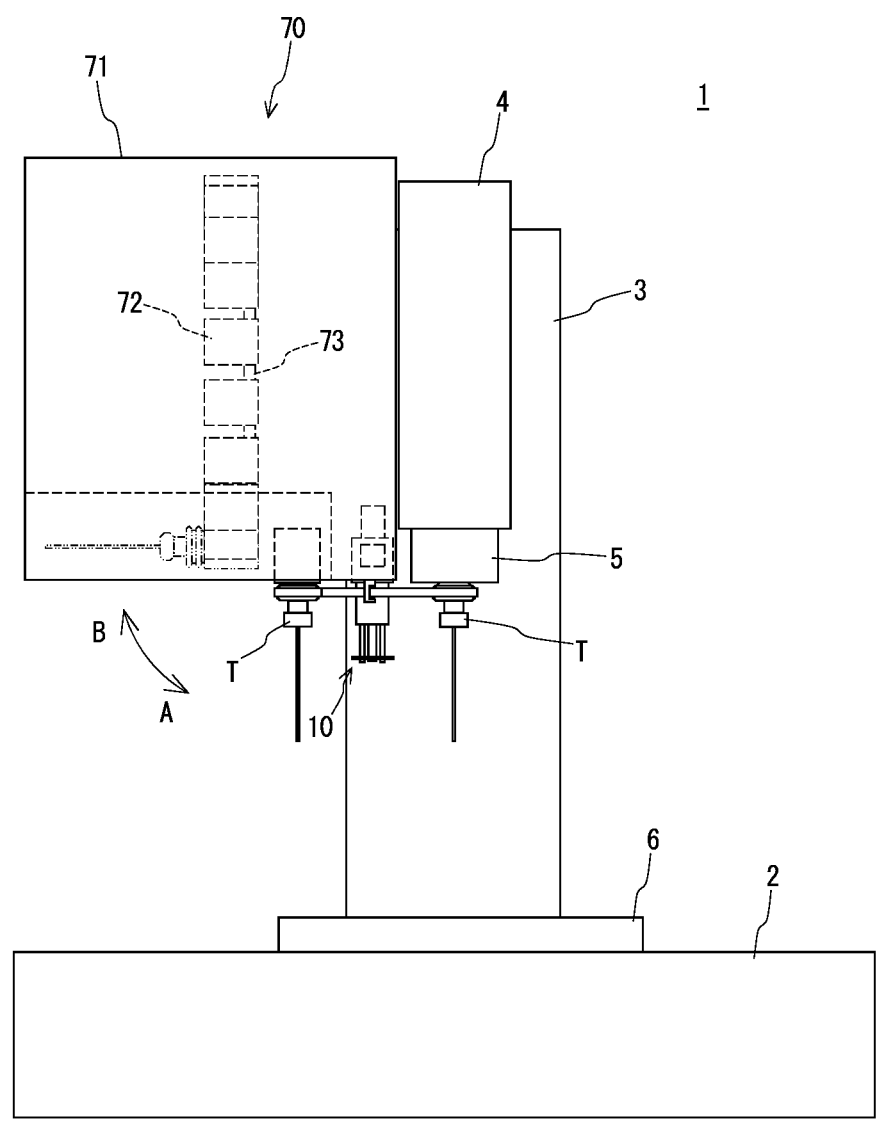
FIG. 1 is a front view of a machine tool according to an embodiment of the present disclosure.

Hereinafter, a tool changer according to an embodiment of the present disclosure will be described with reference to the drawings. As shown in FIG. 1, a tool changer 10 according to this embodiment is attached to a machine tool 1 and the machine tool 1 also has a tool magazine 70 provided thereon. Note that there is no limitation on a machine tool to which the tool changer 10 according to the present embodiment may be applied, and the tool changer 10 may be applied to not only a so-called vertical machining center as shown in FIG. 1 but also various types of machine tools which require tool change, such as a horizontal machining center and a composite lathe capable of turning and milling.

The machine tool 1 shown in FIG. 1 is of a known conventional type and therefore does not need to be explained in detail; however, a brief explanation thereof is provided here. The machine tool 1 includes a bed 2, a column 3 erected on the bed 2, a spindle head 4 disposed on the column 3 to be movable in a vertical direction, a spindle 5 rotatably supported by the spindle head 4, a table 6 disposed on the bed 2 to be movable in two orthogonal horizontal directions for placing and fixing an appropriate workpiece thereon, and other components.

Figure 5:
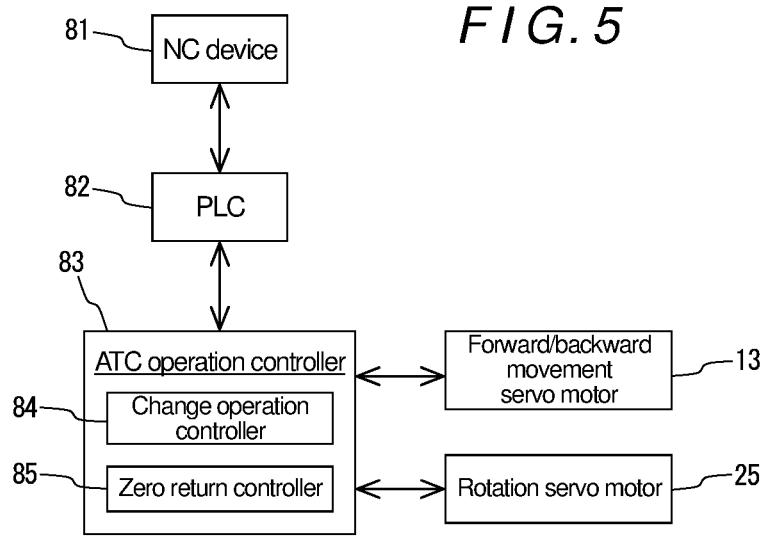
FIG. 5 is a block diagram showing a controller and other components in the embodiment.

The spindle head 4 is configured to be moved in the vertical direction by an appropriate feed apparatus (not shown), and the table 6 is also configured to be moved in the two orthogonal horizontal directions by an appropriate feed apparatus (not shown). Further, the spindle 5 is rotated about an axis thereof by an appropriate spindle motor (not shown). The operations of the feed apparatus (not shown) moving the spindle head 4, the feed apparatus (not shown) moving the table 6, and the spindle motor (not shown) driving the spindle 5 are controlled by an NC device 81 and a PLC (programmable logic controller) 82, which are shown in FIG. 5.

The tool magazine 70 includes a plurality of tool pots 72 each holding a tool T, a holding plate 73 composed of a circular plate member and holding the tool pots 72 which are annularly arranged on a peripheral portion of the holding plate 73, a drive motor (not shown) rotating the holding plate 73, and a calling mechanism (not shown) for moving a tool pot 72 positioned at a lower end position in the arrow A direction to position it at a standby position and moving a tool pot 72 positioned at the standby position in the arrow B direction to cause the holding plate 73 to hold it. Note that the reference 71 in FIG. 1 indicates a cover. The operation of the tool magazine 70 is also controlled by the PLC 82 shown in FIG. 5.

Figure 2:
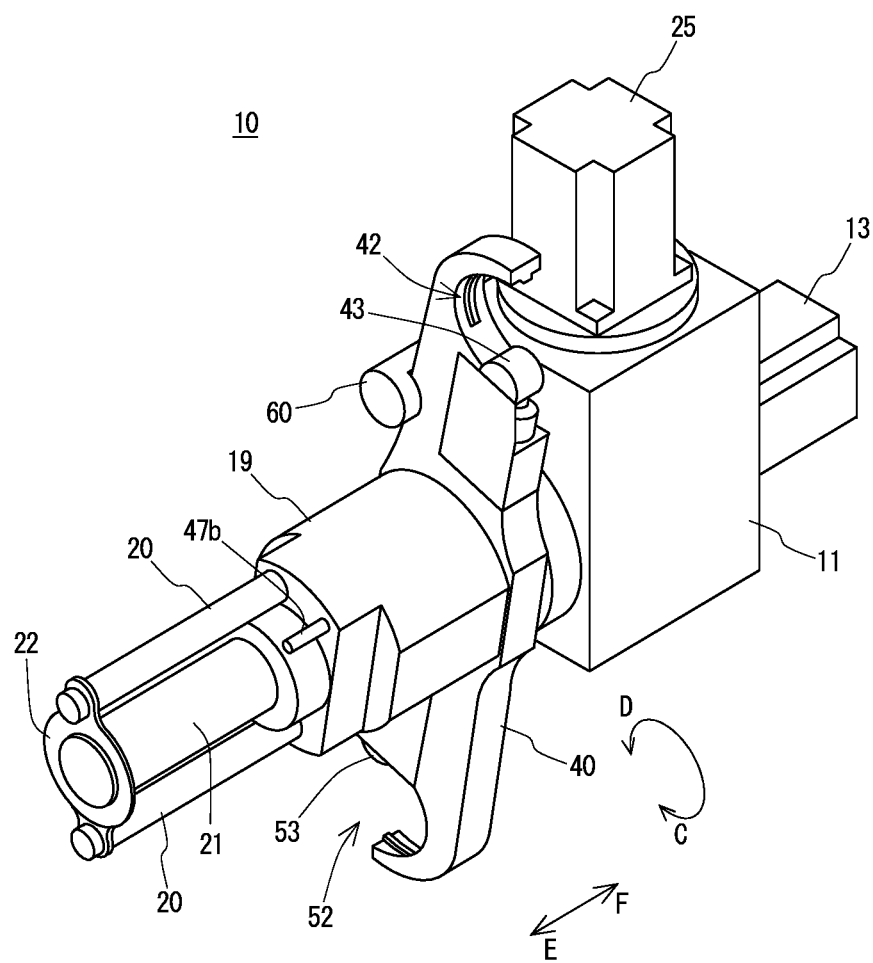
FIG. 2 is a perspective view of a tool changer that is shown in FIG. 1, which is viewed from obliquely below.
Figure 3:
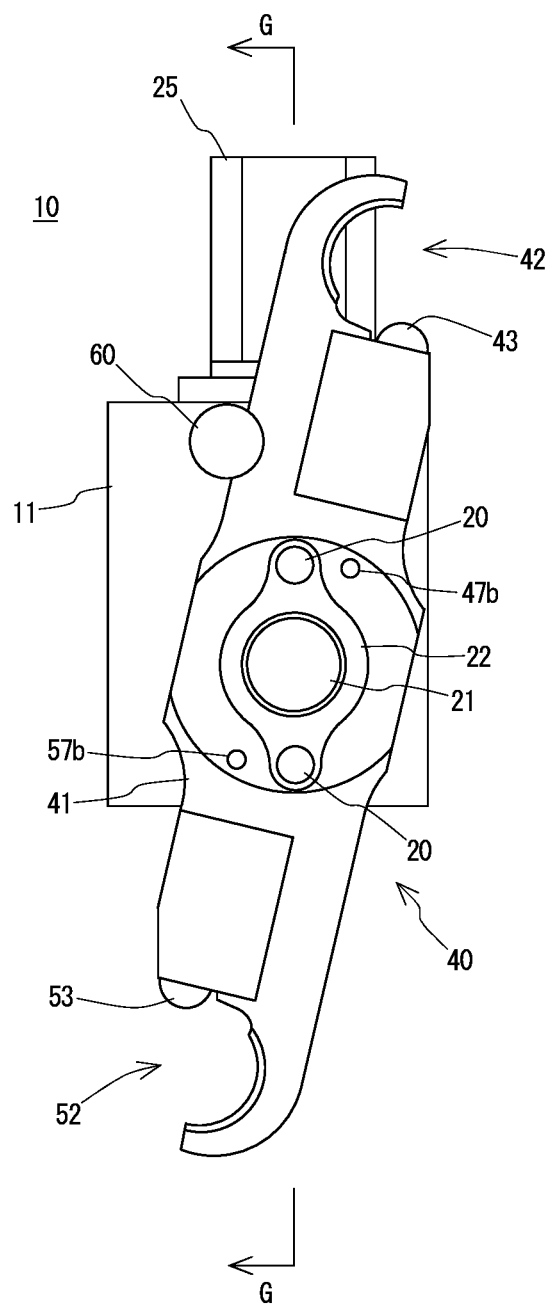
FIG. 3 is a bottom view of the tool changer shown in FIG. 1.
Figure 4:
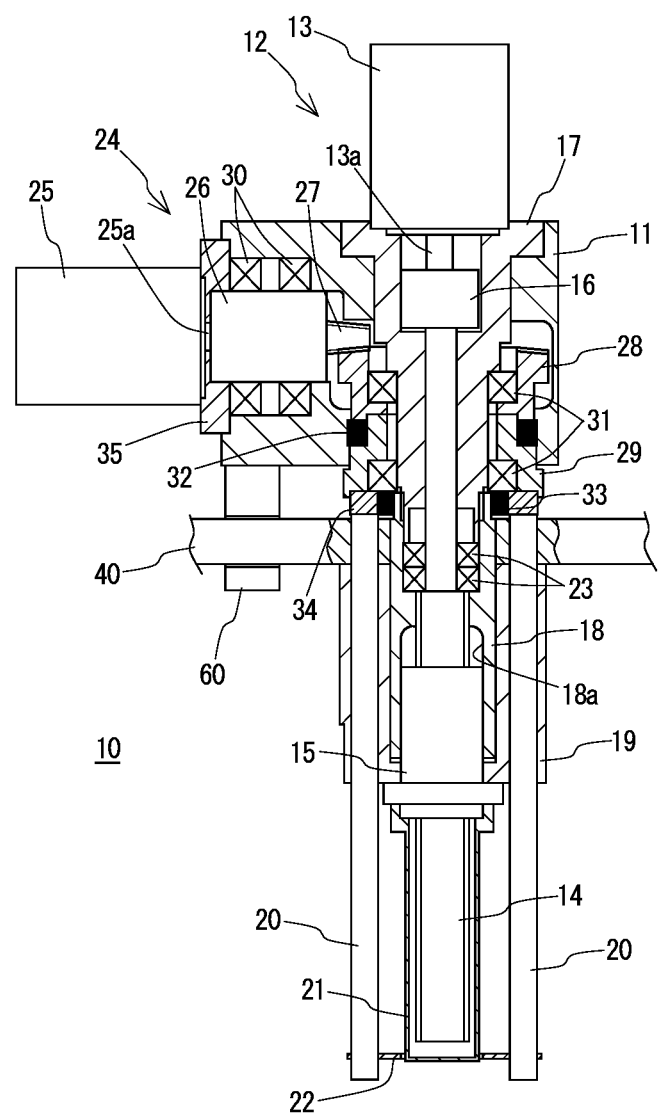
FIG. 4 is a sectional view taken along arrows G-G in FIG. 3.

The tool changer 10 changes a tool (current tool) T attached to the spindle 5 with a tool (next tool) T held by a tool pot 72 positioned at the standby position. The tool changer 10 is composed of a tool change arm 40, a housing 11, a first support shaft 17, a second support shaft 18, a forward/backward moving mechanism 12, and a rotating mechanism 24, which are shown in FIGS. 2 to 4, as well as an ATC operation controller 83, which is shown in FIG. 5.

The housing 11 is composed of a prism-shaped member having an appropriate containing chamber therein, and has the first support shaft 17, the forward/backward moving mechanism 12, and the rotating mechanism 24 attached thereto. The first support shaft 17 is attached to the housing 11 in such a manner that it vertically penetrates the housing 11 and is connected to the second support shaft 18 that is coaxially arranged below the first support shaft 17. Note that the explanation of FIGS. 2 to 4 given below is based on the vertical positional relationship in FIG. 1. Further, the housing 11 has a restraining member 60 provided on a lower surface thereof.

The forward/backward moving mechanism 12 is composed of a forward/backward movement servo motor 13 fixed to an upper end portion of the first support shaft 17, the operation of which is controlled by the ATC operation controller 83 shown in FIG. 5, a ball screw 14 connected to an output shaft 13a of the forward/backward movement servo motor 13 via a coupling 16, and a ball nut 15 screwed with the ball screw 14. The ball screw 14 is inserted in through holes formed in the first support shaft 17 and the second support shaft 18, which holes are along axes of the first and second support shafts 17 and 18, and is rotatably supported by bearings 23, 23 disposed in the though hole of the second support shaft 18. Further, the ball screw 14 is connected to the output shaft 13a of the forward/backward movement servo motor 13 via the coupling 16 as described above at an upper end portion thereof. Furthermore, the second support shaft 18 has a containing hole 18a formed therein which is open to the lower end surface of the second support shaft 18 and the ball nut 15 has an upper portion able to enter the containing hole 18a.

The tool change arm 40 is fitted on an upper end portion of the second support shaft 18 in such a manner that the second support shaft 18 penetrates the tool change arm 40. A holding member 19 fitted on the second support shaft 18 is disposed under the tool change arm 40; the holding member 19 is fixed to the lower surface of the tool change arm 40 at an upper end portion thereof. Further, the ball nut 15 is fixed to the lower surface of the holding member 19 in a state of penetrating the holding member 19 and, as described above, an upper portion of the ball screw 14 is able to enter the containing hole 18a of the second support shaft 18. Further, the ball nut 15 has a cylindrical cover 21 fixed to the lower surface thereof for covering the ball screw 14.

Accordingly, when the forward/backward movement servo motor 13 is driven by the ATC operation controller 83 to rotate the ball screw 14 connected to the output shaft 13a in a normal direction or a reserve direction, the ball nut 15 screwed with the ball screw 14, the holding member 19 and cover 21 connected to the ball nut 15, and the tool change arm 40 connected to the holding member 19 move forward or backward in the arrow E-F direction shown in FIG. 2 along the axis of the ball screw 14. Note that the arrow E direction is the forward direction and the arrow F direction the backward direction, and FIGS. 2 to 4 show a state where the ball nut 15, the holding member 19, the cover 21, and the tool change arm 40 are positioned at a zero point position in the forward/backward movement direction (forward/backward movement zero point).

The rotating mechanism 24 includes a rotation servo motor 25, a coupling 26, a first bevel gear 27, a second bevel gear 28, a connecting body 29, a connecting ring 34, and two guide bars 20. The rotation servo motor 25 is attached to a side surface of the housing 11 via an attachment ring 35. Further, the first bevel gear 27 is disposed in the containing chamber of the housing 11 with an axis of the first bevel gear 27 perpendicular to the axis of the first support shaft 17 and is connected to an output shaft 25a of the rotation servo motor 25 via the coupling 26. Note that the coupling 26 is rotatably supported by bearings 30, 30 disposed in the containing chamber of the housing 11. Further, the rotation servo motor 25 is controlled by the ATC operation controller 83.

The second bevel gear 28 and the connecting body 29 are coaxially connected to each other with the connecting body 29 below the second bevel gear 28 and are fitted on the first support shaft 17 via bearings 31, 31, and the second bevel gear 28 meshes with the first bevel gear 27. Further, the connecting body 29 has the connecting ring 34 fixed to the lower end surface thereof, and the connecting ring 34 has the two guide bars 20, 20 fixed to the lower end surface thereof, the guide bars 20, 20 being arranged in parallel to extend downward from the connecting ring 34 in a state of penetrating the tool change arm 40 and the holding member 19. Furthermore, the guide bars 20, 20 have a connecting plate 22 fixed to lower end portions thereof.

Further, the connecting plate 22 has a through hole formed therein and the cover 21 is able to be inserted in the through hole. Further, a seal 32 is disposed between an outer peripheral surface of the connecting body 29 and an inner peripheral surface of the housing 11 corresponding thereto; the seal 32 provides sealing between the connecting body 29 and the housing 11. Similarly, a seal 33 is disposed between an outer peripheral surface of the second support shaft 18 and an inner peripheral surface of the connecting ring 34; the seal 33 provides sealing between the second support shaft 18 and the connecting ring 34.

Accordingly, when the rotation servo motor 25 is driven by the ATC operation controller 83 to rotate the first bevel gear 27 connected to the output shaft 25a in a normal direction or a reverse direction, the second bevel gear 28 that meshes with the first bevel gear 27, as well as the connecting body 29, connecting ring 34, guide bars 20, 20, and connecting plate 22 that are directly or indirectly connected to the second bevel gear 28, as well as the tool change arm 40 and holding member 19 that the guide bars 20, 20 penetrate, as well as the ball nut 15 and cover 21 that are directly or indirectly connected to the holding member 19 rotate in a normal direction or a reverse direction about the axes of the first support shaft 17 and the second support shaft 18, that is, in the arrow C-D direction shown in FIG. 2. In this connection, in this embodiment, the arrow C direction is the normal rotation direction and the arrow D direction is the reverse rotation direction. Further, FIGS. 2 and 3 show a state where the tool change arm 40 is positioned at a zero point position in the rotational direction (rotation zero point).

Note that the guide bars 20, 20 serve not only to rotate the tool change arm 40 but also to guide the movement of the tool change arm 40 and the holding member 19 when they move forward or backward in the arrow E-F direction.

The tool change arm 40 is composed of a plate-like member 41 and has tool holding parts 42, 52 formed on both end portions thereof for holding the tools T. Each of the tool holding parts 42, 52 has an arc shape having an open side (opening) on the side facing one of the rotation directions (the normal rotation direction) and can receive a tool T through the open side. Note that the tool change arm 40 is, as described above, fitted on the second support shaft 18 and a pair of arm portions is provided to each extend in a radial direction with respect to the second support shaft 18; consequently, the tool change arm 40 can be conceived as having the two arm portions integrally formed to form a straight line.

Each of the tool holding parts 42 and 52 has a holding jaw 43, 53 provided thereon which moves forward and backward with respect to a holding space of the tool holding part 42, 52. When the tools T are inserted into the tool holding parts 42 and 52, the holding jaws 43 and 53 are brought into contact with outer peripheral surfaces of the tools T and thereby moved backward, whereby the tools T are received by the tool holding parts 42 and 52 and held by the tool holding parts 42 and 52. On the other hand, when the tools T are pulled out of the tool holding parts 42 and 52, the holding jaws 43 and 53 are moved backward so as to allow the tools T to be pulled out.

Further, the restraining member 60 is composed of a cylindrical member and has an engagement groove which is formed along a direction perpendicular to an axis of the restraining member 60. The restraining member 60 is, as shown in FIGS. 2 and 3, fixed to the front end surface of the housing 11 so that rotating the tool change arm 40 at the forward/backward movement zero point to the rotation zero point allows the tool change arm 40 to enter (be engaged with) the engagement groove. The restraining member 60 serves to prevent downward movement of the tool change arm 40 by means of this engagement relationship when supply of electrical power to the forward/backward movement servo motor 13 is stopped.

The ATC operation controller 83, as shown in FIG. 5, consists of a change operation controller 84 and a zero return controller 85.

The change operation controller 84 is a functional unit that controls the forward/backward movement servo motor 13 and the rotation servo motor 25 in accordance with a tool change program to cause the tool change arm 40 to change tools. The change operation controller 84 executes a tool change operation in response to a tool change command input therein from the NC device 81 through PLC 82.

Note that the position in the E-F direction (forward/backward movement position) of the tool change arm 40 is recognized based on output values, that is, current rotational position data, output from an encoder (forward/backward movement encoder) attached to the forward/backward movement servo motor 13. The forward/backward movement encoder outputs absolute values (which means that they are not relative values) of current number of revolutions and angle of rotation (rotational position data) of the forward/backward movement servo motor 13, and holds the rotational position data in a memory incorporated therein.

The forward/backward movement zero point is a position such that rotating the tool change arm 40 allows a tool T attached to the spindle 5 positioned at a tool change position to be held by either of the tool holding parts 42 and 52; rotational position data output from the forward/backward movement encoder at this position is designated as the forward/backward movement zero point. Further, a current position with respect to the forward/backward movement zero point is recognized based on difference between rotational position data at the forward/backward movement zero point and current rotational position data, as well as a lead of the ball screw 14.

Further, the position (angular position) in the C-D direction of the tool change arm 40 is recognized based on output values, that is, current rotational position data, output from an encoder (rotation encoder) attached to the rotation servo motor 25. The rotation encoder outputs absolute values of current number of revolutions and angle of rotation (rotational position data) of the rotation servo motor 25, and holds the rotational position data in a memory incorporated therein.

The rotation zero point is an angular position rotated by a predetermined angle in the arrow D direction (reverse direction) from a first turning angle that is an angular position such that a tool T attached to the spindle 5 (current tool) and a tool T positioned at the standby position (next tool) are held by the tool holding parts 42 and 52, respectively; the rotation zero point is set as appropriate in design. Rotational position data output from the rotation encoder when the tool change arm 40 is positioned at this angular position is designated as the rotation zero point. Note that, as described above, the tool change arm 40 is engaged with the engagement groove of the restraining member 60 when it is positioned at the rotation zero point.

Specifically, the change operation controller 84 executes the tool change operation as described below. Note that, as shown in FIG. 1, the spindle 5 is positioned at a position for tool change (tool change position) and the next tool T is positioned at the standby position, and the tool change arm 40 is positioned at the forward/backward movement zero point and the rotation zero point as shown in FIGS. 2 and 3.

Figure 6:
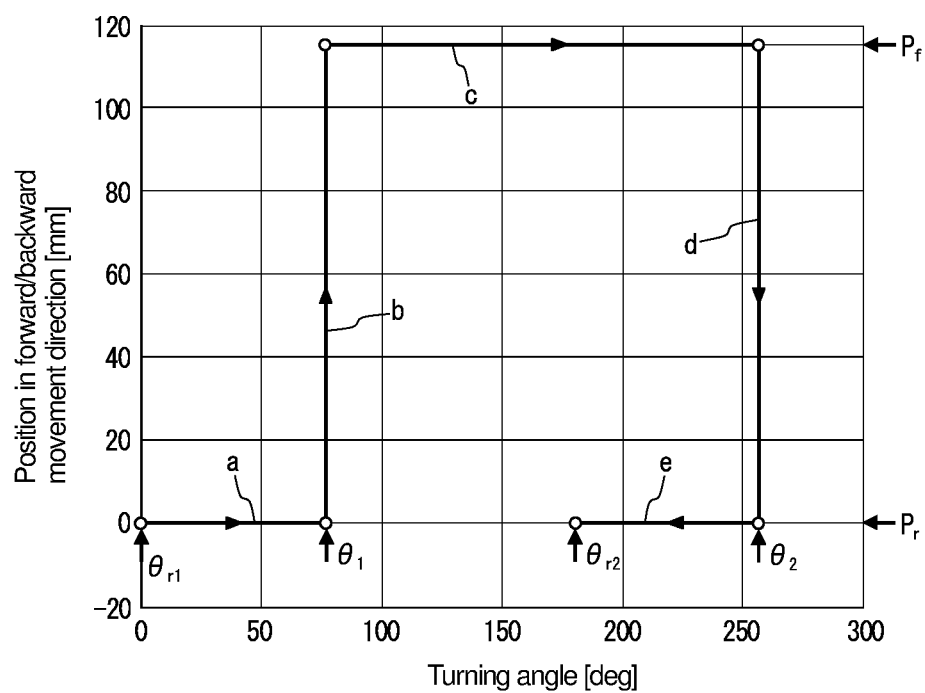
FIG. 6 is a diagram showing an operation path followed by a tool holding part in a tool change operation in the embodiment.

First, the change operation controller 84 drives the rotation servo motor 25 to rotate the tool change arm 40 in the arrow C direction (normal rotation direction) about the axes of the first support shaft 17 and the second support shaft 18 to the first turning angle rotated by the predetermined angle from a current rotation zero point that is a rotation zero point before start of the operation (first rotating operation). Thereby, the tool (current tool) T attached to the spindle 5 is held by the tool holding part 42 and the tool (next tool) T positioned at the standby position is held by the tool holding part 52. This operation corresponds to the path a shown in FIG. 6.

Subsequently, the change operation controller 84 drives the forward/backward movement servo motor 13 to move the tool change arm 40 forward to a forward end, which is located at a lower position, along the first support shaft 17 and the second support shaft 18 (tool pulling operation). Thereby, the tool (current tool) T is pulled out of the spindle 5 and the tool (next tool) T is pulled out of a tool pot 72 positioned at the standby position. This operation corresponds to a path b shown in FIG. 6.

Thereafter, the change operation controller 84 drives the rotation servo motor 25 to rotate the tool change arm 40 to a second turning angle rotated by 180 degrees in the arrow C direction (normal rotation direction) from the first turning angle about the axes of the first support shaft 17 and the second support shaft 18 (second rotating operation). Thereby, the tool (next tool) T held by the tool holding part 52 is positioned coaxially with the spindle 5 just below the spindle 5 and the tool (current tool) T held by the tool holding part 42 is positioned just below the tool pot 72 positioned at the standby position. This operation corresponds to the path c shown in FIG. 6.

Next, the change operation controller 84 drives the forward/backward movement servo motor 13 to move the tool change arm 40 backward along the first support shaft 17 and the second support shaft 18 to the forward/backward movement zero point that is located at an upper position (tool attaching operation). Thereby, the tool (next tool) T is attached to the spindle 5 and the tool (current tool) T is attached to the tool pot 72 at the standby position. This operation corresponds to the path d shown in FIG. 6.

Finally, the change operation controller 84 drives the rotation servo motor 25 to rotate the tool change arm 40 by the predetermined angle in the arrow D direction (reverse rotation direction) about the axes of the first support shaft 17 and the second support shaft 18, thereby rotating the tool change arm 40 to a next rotation zero point that is a rotation zero point after completion of the operation (third rotating operation). Thereby, the tools T are relatively pulled out of the tool holding parts 42 and 52. This operation corresponds to the path e shown in FIG. 6.

The change operation controller 84 executes the tool change operation in the above-described manner. When the change operation controller 84 completes one cycle of the tool change operation, the change operation controller 84 designates rotational position data output from the rotation encoder at the time of the completion as the next rotation zero point. Note that, in FIG. 6, $\theta_{r1}$ is the current rotation zero point, $\theta_{r2}$ is the next rotation zero point, $\theta_1$ is the first turning angle, and $\theta_2$ is the second turning angle.

Figure 7:
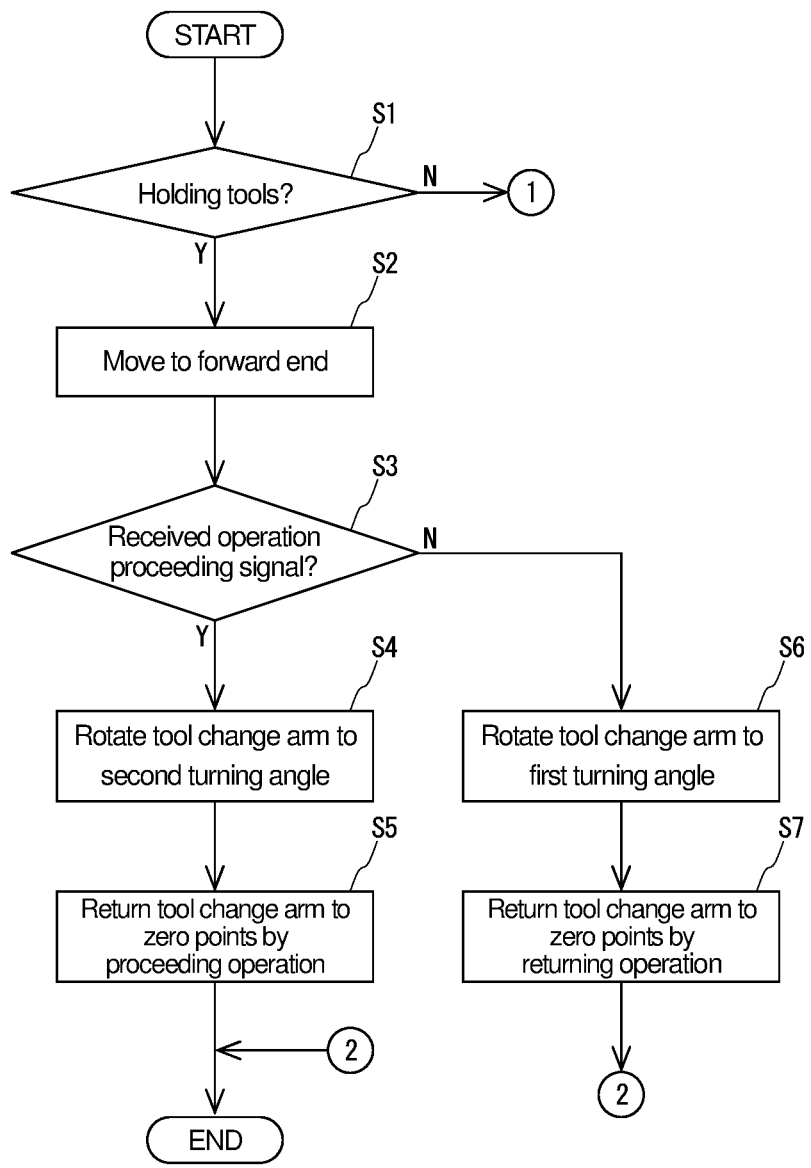
FIG. 7 is a flowchart showing a processing in a zero return controller in the embodiment.
Figure 8:
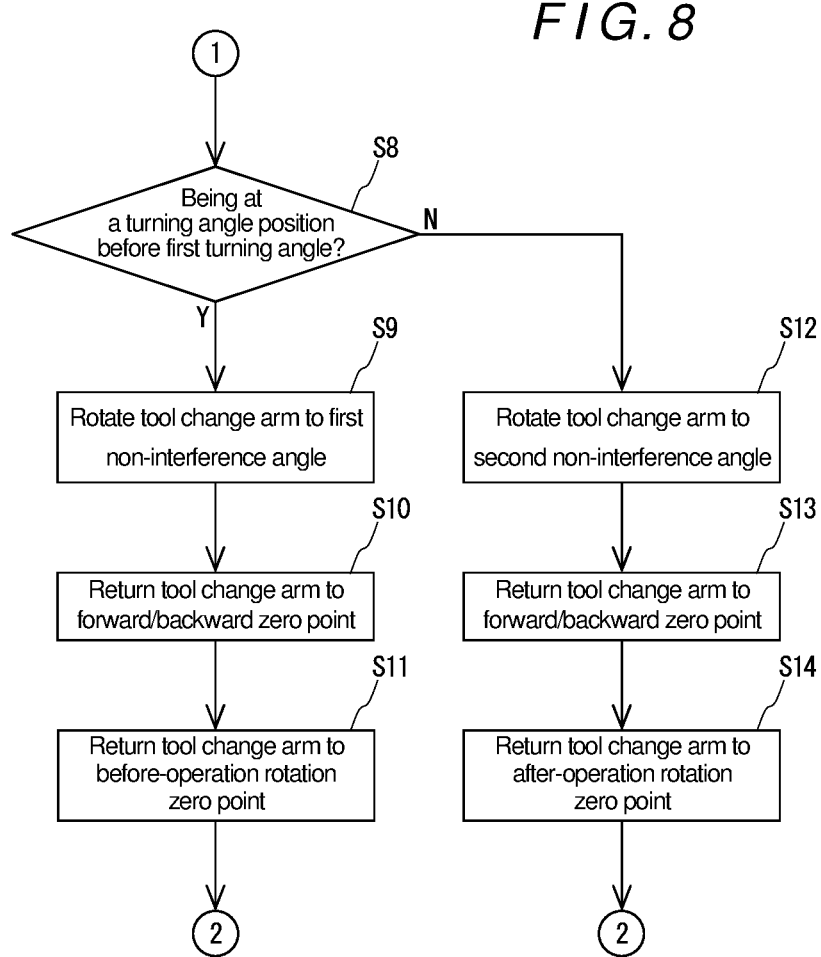
FIG. 8 is a flowchart showing the processing in the zero return controller in the embodiment.

The zero return controller 85 is a functional unit that executes the processing shown in FIGS. 7 and 8 in response to a zero return command input therein from the PLC 82, thereby returning the tool change arm 40 to the forward/backward movement zero point and the rotation zero point.

Specifically, as shown in FIG. 7, the zero return controller 85 first determines whether the tool holding parts 42 and 52 of the tool change arm 40 are holding the tools T (step S1). Note that the change operation controller 84 is configured to update an operation completion flag at the time when each of the above-described first rotating operation, tool pulling operation, second rotating operation, tool attaching operation, and third rotating operation is completed, and the zero return controller 85 checks the latest operation completion flag that is held by the change operation controller 84 to determine whether the tool holding parts 42 and 52 are holding the tools T.

When determining that the tool holding parts 42 and 52 are holding the tools T, the zero return controller 85 then drives the forward/backward movement servo motor 13 to move the tool change arm 40 to the forward end (step S2) and determines whether a signal to proceed with the operation was input from the PLC 82 (step S3). In the case where a signal to proceed with the operation was input, the zero return controller 85 drives the rotation servo motor 25 to rotate the tool change arm 40 to the second turning angle in the arrow C direction (normal direction) (step S4), and then drives the forward/backward movement servo motor 13 to move the tool change arm 40 backward to the forward/backward movement zero point. Subsequently, the zero return controller 85 drives the rotation servo motor 25 to rotate the tool change arm 40 by the predetermined angle in the arrow D direction (reverse direction) to move the tool change arm 40 to a next rotation zero point (step S5).

Figure 9:
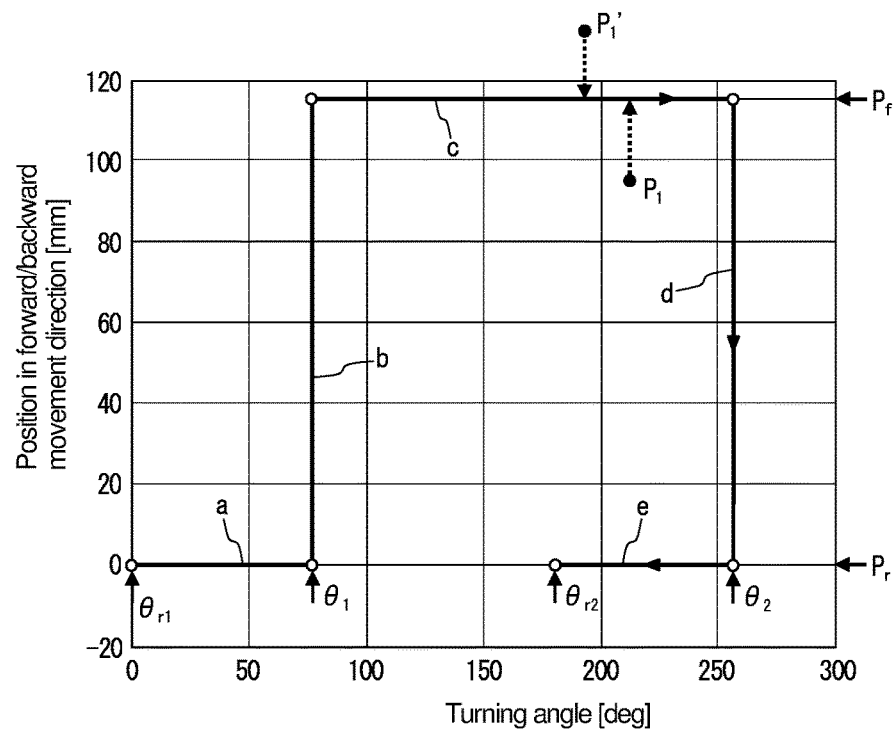
FIG. 9 is a diagram for explaining a path for zero return executed by the zero return controller in the embodiment.

This operation is explained based on FIG. 9. When the tool holding parts 42 and 52 are holding the tools T, the tool change arm 40 is in a state where the tool pulling operation has been completed. Therefore, the tool holding part 42 of the tool change arm 40 is positioned near the forward end $P_f$. For example, assumed that the tool holding part 42 is positioned at the position $P_1$ or the position $P_1'$ in FIG. 9, the tool holding part 42 is moved to the forward end $P_f$, and then moved to the forward/backward movement zero point $P_r$, and the next rotation zero point $\theta_{r2}$ by a proceeding operation, that is, through the paths c, d, and e. Note that, in FIG. 9, $\theta_{r1}$ is the current rotation zero point, $\theta_{r2}$ is the next rotation zero point, $\theta_1$ is the first turning angle, and $\theta_2$ is the second turning angle (the same is applied to FIGS. 10 to 13 described later).

On the other hand, in the case where, in the step S3, a signal to return the operation was input from the PLC 82, the zero return controller 85 drives the rotation servo motor 25 to rotate the tool change arm 40 to the first turning angle, and then drives the forward/backward movement servo motor 13 to move the tool change arm 40 backward to the forward/backward movement zero point. Subsequently, the zero return controller 85 drives the rotation servo motor 25 to rotate the tool change arm 40 by the predetermined angle in the arrow D direction (reverse direction) to move the tool change arm 40 to the next rotation zero point.

Figure 10:
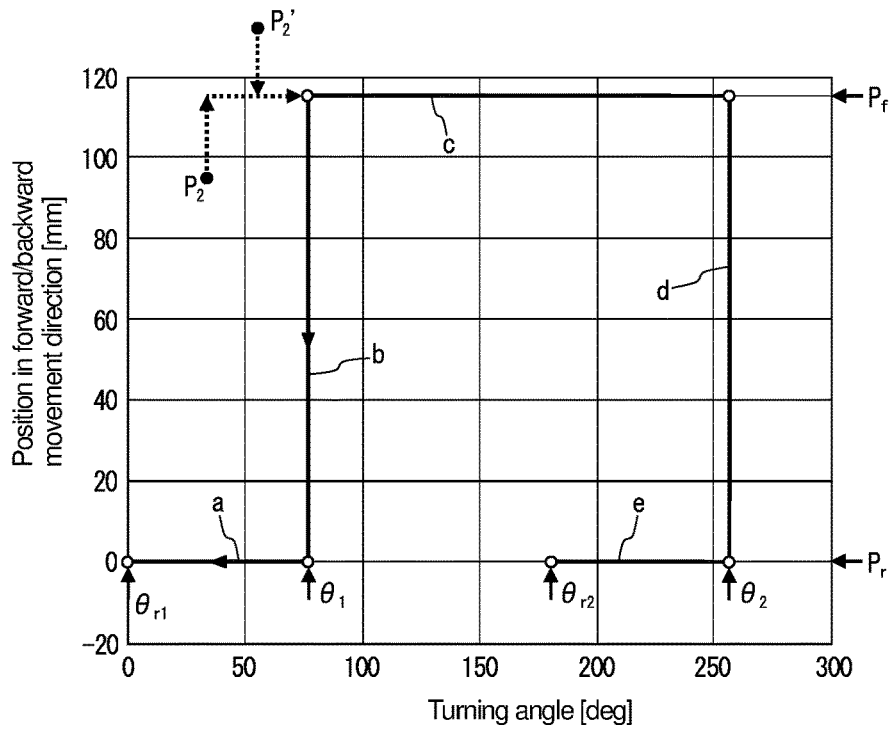
FIG. 10 is a diagram for explaining a path for zero return executed by the zero return controller in the embodiment.
Figure 11:
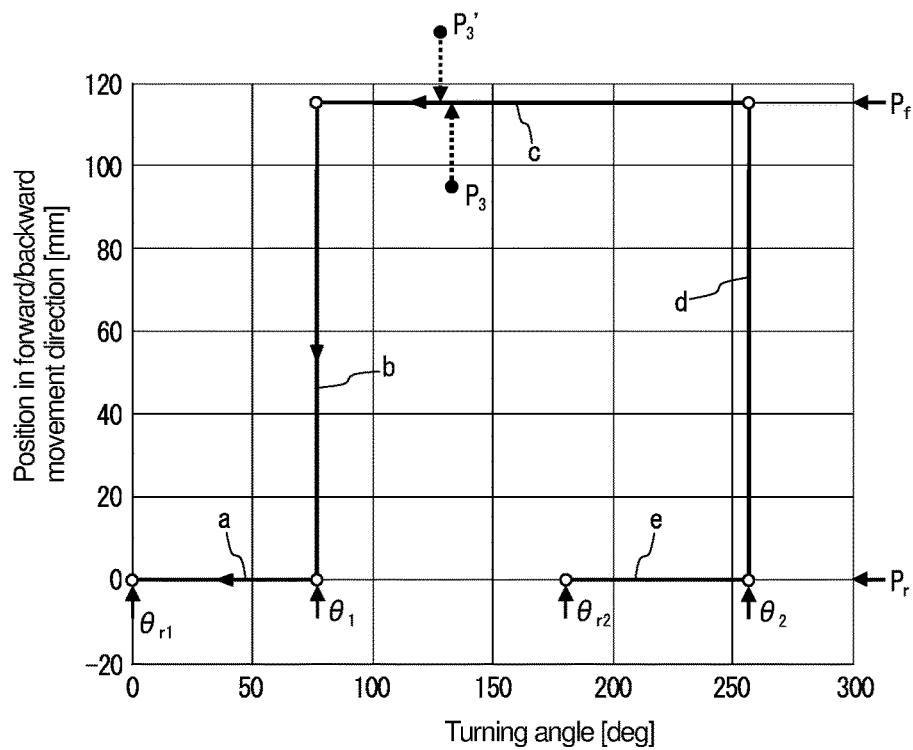
FIG. 11 is a diagram for explaining a path for zero return executed by the zero return controller in the embodiment.

This operation is shown in FIGS. 10 and 11. FIG. 10 shows a case where the tool holding part 42 of the tool change arm 40 is positioned at the position $P_2$ or the position $P_2'$ between the current rotation zero point $\theta_{r1}$ and the first turning angle $\theta_1$. In this case, the tool holding part 42 is moved to the forward end $P_f$ and then rotated to the first turning angle $\theta_1$, and subsequently is moved to the forward/backward movement zero point $P_r$ and the current rotation zero point $\theta_{r1}$ by a returning operation, that is, through the paths b and a.

Further, FIG. 11 shows a case where the tool holding part 42 of the tool change arm 40 is positioned at the position $P_3$ or the position $P_3'$ between the first turning angle $\theta_1$ and the second turning angle $\theta_2$. Also in this case, the tool holding part 42 is moved to the forward end $P_f$ and then rotated to the first turning angle $\theta_1$, and subsequently is moved to the forward/backward movement zero point $P_r$ and the current rotation zero point $\theta_{r1}$ by a returning operation, that is, through the paths b and a.

Thus, in the case where it is determined in the step S1 that the tool holding parts 42 and 52 are holding the tools T, the tool change arm 40 is returned to the forward/backward movement zero point $P_r$ and the rotation zero point (current rotation zero point or next rotation zero point) by the above-described process consisting of the steps S2, S3, S4, and S5 or process consisting of the steps S2, S3, S6, and S7, and then the processing ends.

On the other hand, when determining in the step S1 that the tool holding parts 42 and 52 are not holding the tools T, the zero return controller 85 then determines whether the turning angle of the tool change arm 40 is before the first turning angle $\theta_1$ (step S8). In the case where the turning angle of the tool change arm 40 is before the first turning angle $\theta_1$, the zero return controller 85 drives the rotation servo motor 25 to rotate the tool change arm 40 to a first non-interference angle $\theta_{n1}$ (step S9), and subsequently drives the forward/backward movement servo motor 13 to move the tool change arm 40 to the forward/backward movement zero point $P_r$ (step S10) and then drives the rotation servo motor 25 to rotate the tool change arm 40 by the predetermined angle in the arrow D direction (reverse direction), thereby moving the tool change arm 40 to the current rotation zero point $\theta_{r1}$ (step S11). This operation is executed regardless of whether a signal to proceed with the operation was input from the PLC 82 or a signal to return the operation was input from the PLC 82.

Note that the non-interference angle is an angle to which the tool change arm 40 can be rotated without interference with the other structures (such as the restraining member 60) and at which the tool change arm 40 does not interfere with the other structures (such as the restraining member 60) even when the tool change arm 40 is moved forward or backward at the angular position. The first non-interference angle $\theta_{n1}$ is set between the current rotation zero point and the first turning angle $\theta_1$. The non-interference angle may be previously set, for example, based on a structure design relationship, and may have a certain range.

Figure 12:
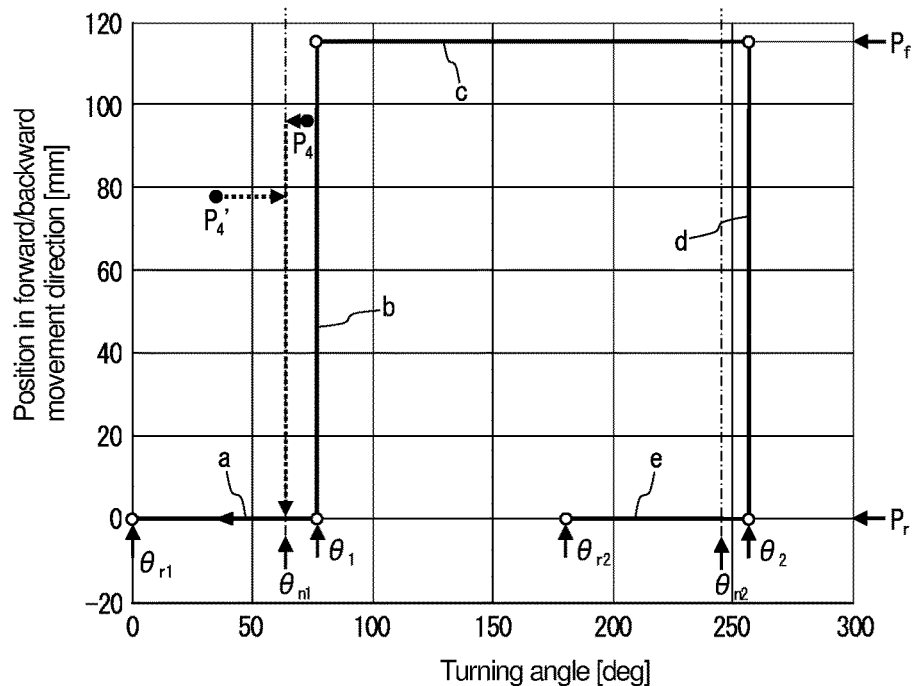
FIG. 12 is a diagram for explaining a path for zero return executed by the zero return controller in the embodiment.

This operation is shown in FIG. 12. FIG. 12 shows a case where the tool holding part 42 of the tool change arm 40 is positioned at the position $P_4$ or the position $P_4'$ between the current rotation zero point $\theta_{r1}$ and the first turning angle $\theta_1$. In this case, the tool holding part 42 is rotated to the first non-interference angle $\theta_{n1}$, and subsequently is moved to the forward/backward movement zero point $P_r$ and then returned to the current rotation zero point along the path a.

On the other hand, when it is determined in the step S8 that the turning angle of the tool change arm 40 is between the first turning angle and the second turning angle, the zero return controller 85 drives the rotation servo motor 25 to rotate the tool change arm 40 to a second non-interference angle (step S12), and subsequently drives the forward/backward movement servo motor 13 to move the tool change arm 40 to the forward/backward movement zero point (step S13) and then drives the rotation servo motor 25 to rotate the tool change arm 40 by the predetermined angle in the arrow D direction (reverse direction), thereby moving the tool change arm 40 to the next rotation zero point (step S14). This operation is also executed regardless of whether a signal to proceed with the operation is input from the PLC 82 or a signal to return the operation is input from the PLC 82. Further, the second non-interference angle is set between the next rotation zero point and the second turning angle, and, for example, is an angular position at which the tool change arm 40 does not interfere with the restraining member 60 even when the tool change arm 40 is moved forward or backward at the angular position.

Figure 13:
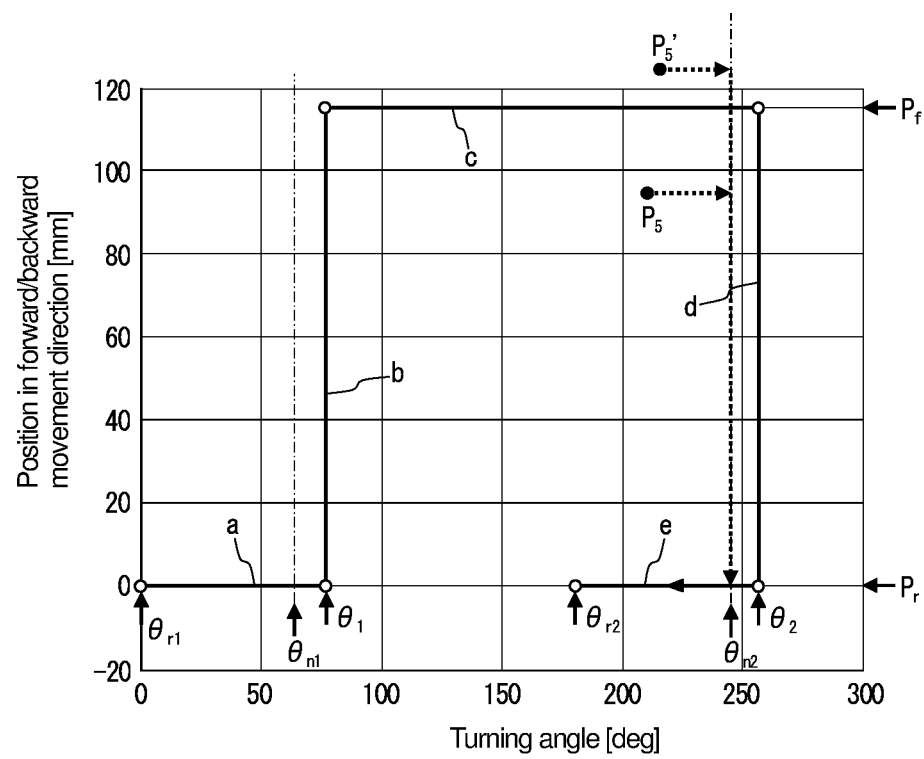
FIG. 13 is a diagram for explaining a path for zero return executed by the zero return controller in the embodiment.

This operation is shown in FIG. 13. FIG. 13 shows a case where the tool holding part 42 of the tool change arm 40 is positioned at the position $P_5$ and the position $P_5'$ between the first turning angle $\theta_1$ and the second turning angle $\theta_2$. In this case, the tool holding part 42 is rotated to the second non-interference angle $\theta_{n2}$, and subsequently is moved to the forward/backward movement zero point $P_r$ and then returned to the next rotation zero point $\theta_{r2}$.

Thus, in the case where it is determined in the step S1 that the tool holding parts 42 and 52 are not holding the tools T, the tool change arm 40 is returned to the forward/backward movement zero point $P_r$ and the rotation zero point (current rotation zero point or next rotation zero point) by the above-described process consisting of the steps S8, S9, S10, and S11 or process consisting of the steps S8, S12, S13, and S14, and then the processing ends.

According to the tool changer 10 according to this embodiment having the above-described configuration, the forward/backward moving mechanism 12 and the rotating mechanism 24 are controlled by the change operation controller 84 of the ATC operation controller 83, whereby the tool change arm 40 is driven by the forward/backward moving mechanism 12 and the rotating mechanism 24 to execute the first rotating operation, the tool pulling operation, the second rotating operation, the tool attaching operation, and the third rotating operation. By these operations, a tool T attached to the spindle 5 is changed with a next tool T positioned at the standby position.

Further, if the tool changer 10 is stopped during the operation thereof due to an emergency stop of the machine tool 1 and therefore the tool change arm 40 needs to be returned to the forward/backward movement zero point and the rotation zero point, the processing shown in FIGS. 7 and 8 is executed by the zero return controller 85, whereby the tool change arm 40 is returned to the forward/backward movement zero point and the rotation zero point.

Thus, as described above, the tool changer 10 according to this embodiment allows the tool change arm 40 to be automatically returned to the forward/backward movement zero point and the rotation zero point when the tool change arm 40 in operation is stopped halfway; therefore, the tool changer 10 according to this embodiment enables a rapid and efficient recovery from a trouble. Further, even when there is another structure (for example, the restraining member 60) which interferes with the tool change arm 40 when the tool change arm 40 is moved forward or backward, the tool change arm 40 which is positioned at a position deviating from a regular operation path can be returned to the forward/backward movement zero point and the rotation zero point without interfering with the other structures when being returned to the forward/backward movement zero point and the rotation zero point.

Thus, one embodiment of the present disclosure has been described; however, the present disclosure is not limited thereto and may be implemented in other modes.

For example, as described above, there is no limitation on a machine tool to which the tool changer 10 according to the above embodiment may be applied; the tool changer 10 can be favorably applied not only to a so-called vertical machining center as employed in the above embodiment but also to a horizontal machining center, a composite lathe capable of turning and milling, and the like.

Further, the tool change arm 40 in the above embodiment is a double arm type; however, the present disclosure is not limited thereto and a tool changer having three or more tool change arms may be employed.

Further, the determination whether the tool holding parts 42 and 52 are holding the tools T (step S1) may be made by providing a sensor near each of the tool holding parts 42 and 52 to detect the presence or absence of a tool T and determining the presence or absence of the tools T based on the detection results.

What is claimed is:

1. A tool changer for changing a tool attached to a spindle of a machine tool with a next tool positioned at a standby position, the tool changer comprising:
    a holding member disposed to have a center axis parallel to an axis of the spindle and provided to be rotatable about the center axis and to be movable in a direction along the axis of the spindle;
    a rotating mechanism including a rotation servo motor and rotating the holding member in opposing first and second directions about the center axis by using power of the rotation servo motor;
    a forward and backward moving mechanism including a forward and backward movement servo motor and moving the holding member forward and backward in the direction along the axis of the spindle by using power of the forward and backward movement servo motor;
    a tool change arm having at least two arm portions each disposed on the holding member to extend in a respective radial direction with respect to the center axis of the holding member and each having a tool holding part having an opening in a side surface thereof facing the first rotation direction of the holding member, the at least two arm portions holding the tool and the next tool with the tool holding parts thereof in such a manner that axes of the tool and the next tool are parallel to the center axis of the holding member; and
    a controller numerically controlling the rotation servo motor with respect to a rotation zero point set at a predetermined angular position in a rotational direction about the center axis to rotate the holding member and the tool change arm, and numerically controlling the forward and backward movement servo motor with respect to a forward and backward movement zero point set at a predetermined position in the direction along the axis of the spindle to move the holding member and the tool change arm forward and backward, thereby causing the tool change arm to execute a change operation in which the tool holding parts of the tool change arm move on a predetermined path,
    the controller further including a zero return controller returning the tool change arm to the rotation zero point and the forward and backward movement zero point when the change operation executed by the tool change arm is stopped halfway through, and
    the zero return controller being configured to execute:
        a first processing of determining whether the tool holding parts of the tool change arm are holding the tool and the next tool,
        a second processing of, when it is determined in the first processing that the tool holding parts are not holding the tool and the next tool, rotating the tool change arm to a non-interference angle, and subsequently moving the tool change arm backward to the forward and backward movement zero point and then rotating the tool change arm to the rotation zero point, the non-interference angle being a predetermined angle to which the tool change arm can be rotated without interference with other structures and at which the tool change arm does not interfere with the other structures even when the tool change arm is moved forward or backward, and
        a third processing of, when it is determined in the first processing that the tool holding parts are holding the tool and the next tool, moving the tool change arm to a position corresponding to a forward end of the path along the forward and backward movement direction, and, if the tool holding parts are not positioned on the path, subsequently rotating the tool change arm so as to position the tool holding parts on the path, and then moving the tool change arm so that the tool holding parts follow the path, thereby moving the tool change arm to the rotation zero point and the forward and backward movement zero point.

2. The tool changer according to claim 1, wherein
the tool change arm includes two of said at least two arm portions, each of the two arm portions extending in a respective radial direction with respect to the center axis of the holding member thereby forming a respective straight line,
the controller is configured to control the rotation servo motor and the forward and backward movement servo motor to cause the tool change arm to execute a change operation including:
  a first rotating operation of rotating the tool change arm to a first turning angle to cause the tool holding parts to hold the tool and the next tool, the first turning angle being an angle rotated by a predetermined angle in the first direction from a current rotation zero point, the current rotation zero point being a rotation zero point before the start of the operation and;
  a tool pulling operation of moving the tool change arm forward to a forward end;
  a second rotating operation of rotating the tool change arm to a second turning angle, the second turning angle being an angle rotated by 180 degrees in the first direction from the first turning angle;
  a tool attaching operation of moving the tool change arm backward to the forward and backward movement zero point; and
  a third rotating operation of rotating the tool change arm to a next rotation zero point, the next rotation zero point being an angular position rotated by the predetermined angle in the second direction from the second turning angle and being a rotation zero point after completion of the change operation, and
the zero return controller is configured to, in the second processing:
  when the tool change arm is positioned between the current rotation zero point and the first turning angle, rotate the tool change arm to a first non-interference angle set between the current rotation zero point and the first turning angle, and subsequently move the tool change arm backward to the forward and backward movement zero point and then rotate the tool change arm to the current rotation zero point, and
  on the other hand, when the tool change arm is positioned between the first turning angle and the second turning angle, rotate the tool change arm to a second noninterference angle set between the next rotation zero point and the second turning angle, and subsequently move the tool change arm backward to the forward and backward movement zero point and then rotate the tool change arm to the next rotation zero point.

3. The tool changer according to claim 2, wherein:
the zero return controller is configured to, in the third processing:
  after moving the tool change arm to a position corresponding to the forward end of the path along the forward and backward movement direction,
  when the tool change arm is positioned between the current rotation zero point and the first turning angle, rotate the tool change arm to the first turning angle, and subsequently move the tool change arm backward to the forward and backward movement zero point and then rotate the tool change arm to the current rotation zero point, and
  on the other hand, when the tool change arm is positioned between the first turning angle and the second turning angle, first rotate the tool change arm to the first turning angle, and subsequently move the tool change arm backward to the forward and backward movement zero point and then rotate the tool change arm to the current rotation zero point, or first rotate the tool change arm to the second turning angle, and subsequently move the tool change arm backward to the forward and backward movement zero point and then rotate the tool change arm to the next rotation zero point.

* * * * *